(12) United States Patent
Da Silva et al.

(10) Patent No.: US 8,229,882 B2
(45) Date of Patent: Jul. 24, 2012

(54) SYSTEM AND METHOD FOR BUSINESS INTELLIGENCE METADATA EXCHANGE

(75) Inventors: Ricardo Da Silva, Ontario (CA); Julia Perlman, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1850 days.

(21) Appl. No.: 10/856,036

(22) Filed: May 28, 2004

(65) Prior Publication Data

US 2005/0278304 A1 Dec. 15, 2005

(51) Int. Cl.
*G06F 7/00* (2006.01)
*G06F 17/00* (2006.01)
(52) U.S. Cl. .................... 707/601; 707/661; 707/802
(58) Field of Classification Search ............... 707/104.1, 707/513, 6, 523; 709/223; 715/530
See application file for complete search history.

(56) References Cited

U.S. PATENT DOCUMENTS

| 6,836,773 | B2 * | 12/2004 | Tamayo et al. | 707/6 |
| 2002/0099735 | A1 * | 7/2002 | Schroeder et al. | 707/513 |
| 2004/0123246 | A1 * | 6/2004 | Wu | 715/530 |
| 2005/0044197 | A1 * | 2/2005 | Lai | 709/223 |
| 2005/0120051 | A1 * | 6/2005 | Danner et al. | 707/104.1 |

OTHER PUBLICATIONS

Medjahed et al. (Non-Patent Literature: "Business-to-business interactions: issues and enabling technologies", Brahim Medjahed, Boualem Benatalla, Athman Bouguettaya, Anne H. H. Ngu, Ahmed K. Elmagarmid, published online: Apr. 3, 2003, Springer-Verlag 2003).*

* cited by examiner

*Primary Examiner* — Giovanna Colan
(74) *Attorney, Agent, or Firm* — Shumaker & Sieffert, P.A.

(57) ABSTRACT

The invention makes use of a single data structure to define all of the information and parameters necessary for the efficient sharing and exchange of entire or partial BI applications. The invention enables a user to capture preferences that are applicable to both ends of the exchange, namely the source and the target systems. It provides for users to be presented with a comprehensive list of preferences and smart defaults from which they can select, and in some cases override, at both the source and target end points of the exchange. The actual metadata exchange is persisted as an exchange structure in a computer system file system called an exchange archive.

15 Claims, 5 Drawing Sheets

Public folders content:
Change the target name of the folders if you do not want to overwrite them in the archive.
Disable after import if you do not want users to access them in the target after import.

|   | Name | Target Name | Disable after import | In target specification | In target content | Modified |
|---|---|---|---|---|---|---|
| ☑ | GO data warehouse | GO data warehouse | ☐ | ☑ | ☑ | 2004-01-21 |
| ☑ | GO Sales and Retailers | GO Sales and Retailers | ☐ | ☑ | ☑ | 2004-02-01 |

Options

☐ Include report output versions

⊘ Keep existing versions

⊘ Replace existing versions

☑ Include schedules

● Keep existing versions

○ Replace existing versions

☐ Include run history

⊘ Keep existing versions

⊘ Replace existing versions

[ Cancel ] [ < Back ] [ Next > ] [ Finish ]

FIG. 5

600
Specify the general options:
Access permissions ─────────────────────
☐ Include access permissions
⊙ Apply to new entries only
⊘ Apply to new and existing entries
External namespaces ─────────────────────
⊙ Keep existing versions
⊘ Replace existing versions
[ Cancel ]  [ < Back ]  [ Next > ]  [ Finish ]
FIG. 6
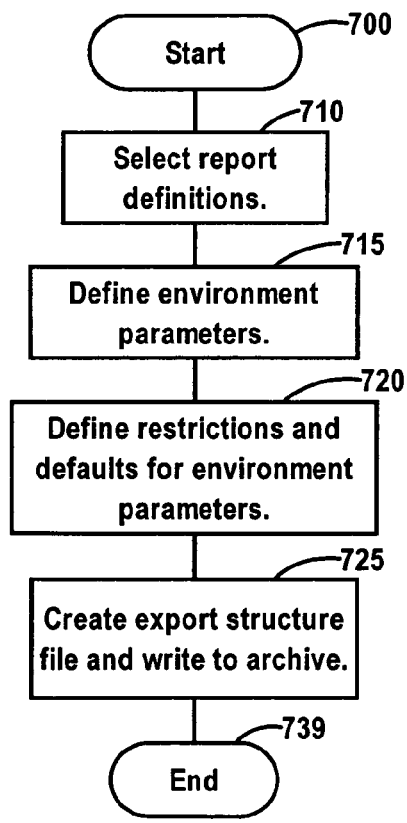
FIG. 7
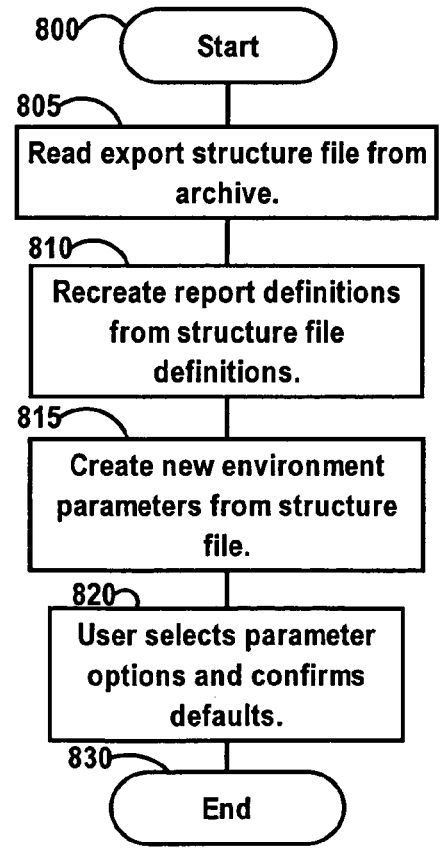
FIG. 8

SYSTEM AND METHOD FOR BUSINESS INTELLIGENCE METADATA EXCHANGE

FIELD OF THE INVENTION

The invention concerns the sharing between business intelligence (BI) systems, of data and metadata describing reports and associated data and metadata describing the related environments among both homogeneous and compatible heterogeneous computer systems.

BACKGROUND OF THE INVENTION

In complex business intelligence systems, it is common to have to deal with issues concerning the differences in data representation, schemas, and types of data source. Within business intelligence systems a content management subsystem stores, serves, and manages static and dynamic application objects that are required by other Business Intelligence subsystems to perform an activity. These objects are created according to application needs and include data source definitions, report definitions, pre-assembled web pages, and Adobe Acrobat PDF documents.

Thus organizations use content management software as the primary source of both static and dynamic metadata required to run a business intelligence application. The content management software provides structure and checks and balances to ensure the integrity and authorized access to the information under its responsibility.

In BI systems, many application objects are required to be shared between various instances of an application suite. This sharing of application objects is required in order to replicate the same business application on several homogeneous or heterogeneous computer systems. This includes situations where a third-party developer packages a collection of reports, for use with a particular business intelligence system (such as ReportNet™ by Cognos Corporation), for specific industries, such as retailers, and offers such collections of reports for sale. These reports rely on specific arrangements of data sources, access policies, configuration information, and other parameters that relate the information in the reports. This means that the definition of this other information must also be distributed with the collection of reports. It is also usual for the third-party developer or exporter to define limitations on the configuration or organization of the importing or target system.

In current BI systems, the processes used to share data and metadata among computer systems often require the use of complicated import and export definitions, third party tools, and require constant user interaction. Administrator users of source systems may spend hours configuring metadata exchanges and attempt several tries before a successful exchange is achieved. Often administrator users must exchange installments of application objects until all application objects have been successfully exchanged between source and target systems.

SUMMARY OF THE INVENTION

The invention provides for a method and system that alleviates many of the disadvantages of earlier methods and systems.

The invention makes use of a single data structure to define all of the information and parameters necessary for the efficient sharing and exchange of entire or partial BI applications. The invention enables a user to capture preferences that are applicable to both ends of the exchange, namely the source and the target systems. It provides for users to be presented with a comprehensive list of preferences and smart defaults from which they can select, and in some cases override, at both the source and target end points of the exchange. The actual metadata exchange is persisted as an exchange structure in a computer system file system called an exchange archive.

The invention allows a source or exporting user (often an administrator) to select sections of the source BI application that are exchangeable without removing all aspects of control from the receiving or target end. For instance, the invention allows an administrator to move report definition data and metadata from a development or test environment (source) into a production environment (target). This means changes can be developed in a safe, development environment and tested in that environment before deploying them to a live, production environment. Similarly, the exchange structure and supporting export and import processes simplify the upgrade process from one release of a reporting application to a subsequent release of that reporting application. The contents of the exchange archive can also be used to restore a damaged application, or as backup.

BRIEF DESCRIPTION OF THE DRAWINGS

Embodiments of the invention are described with reference to the following drawings.

FIGS. 5 and 6 show simplified examples of the user interface in the form of screenshots.

FIGS. 7 and 8 are flowcharts for the exporting and importing processes respectively.

DETAILED DESCRIPTION OF EMBODIMENTS OF THE INVENTION

Figure 1:
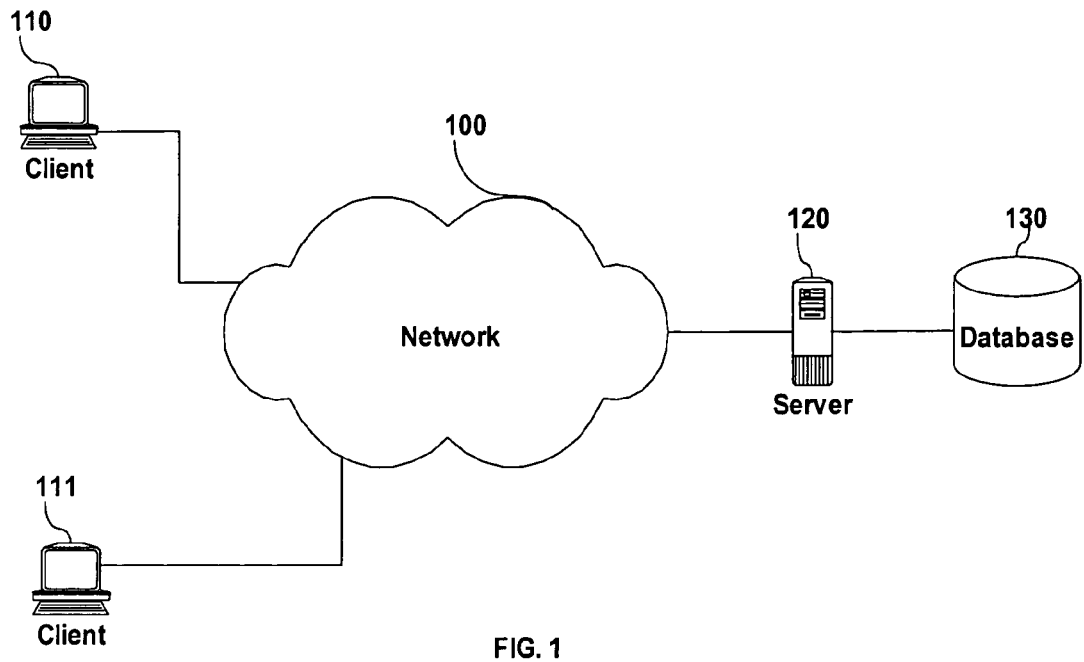
FIG. 1 shows a network environment suitable for business intelligence systems which make use of the invention.

Turning first to FIG. 1, which shows a typical network environment in which embodiments of the invention may be practiced, we see a number of clients 110, 111, interacting with a server 120 over a network 100. These clients are general purpose, and their actual function may vary, but in this case they represent user-controlled terminals having software installed that allows thin client operation, often a web browser and associated applets. The server is also a general purpose computer having installed in it software to carry out Business Intelligence functions and ancillary operations, including content management. The server 120 is connected to one or more data sources, or data warehouses 130. These data sources contain business data used to produce reports required by users. These reports may be displayed on screens of the client computers 110, 111, but in some cases hard copy can be produced using printers (not shown) associated with the clients or server.

In the following descriptions the content management function, or content manager, has been shown separately from the rest of the business intelligence application suite to emphasize its role in embodiments of the invention. Normally it is considered an integral part of that suite.

Figure 2:
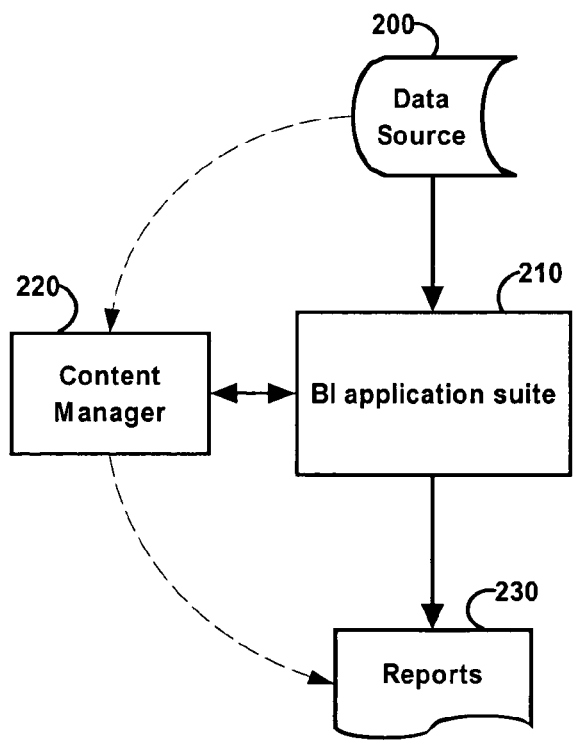
FIG. 2 shows a simplified version of a BI system in which embodiments of the invention may be practiced.

FIG. 2 shows in outline form the major aspects of a business intelligence system capable of making use of embodiments of the present invention. The Business Intelligence (BI) application suite 210 makes use of a content manager 220 to store and serve report definitions from which to construct reports 230. The content manager 220 stores and serves definitions of one or more business data sources 200, among other environment data, required by the reporting subsystem (not shown). The one or more business data sources 200 are typically read-only, since they contain historical information from which business trends and other analyses can be produced. The BI application suite 210 carries out many different functions, including facilitating the development of report formats and the format conversion of different data sources which permit large businesses to maintain a uniform reporting process, even where they original data has different formats and content.

Figure 3:
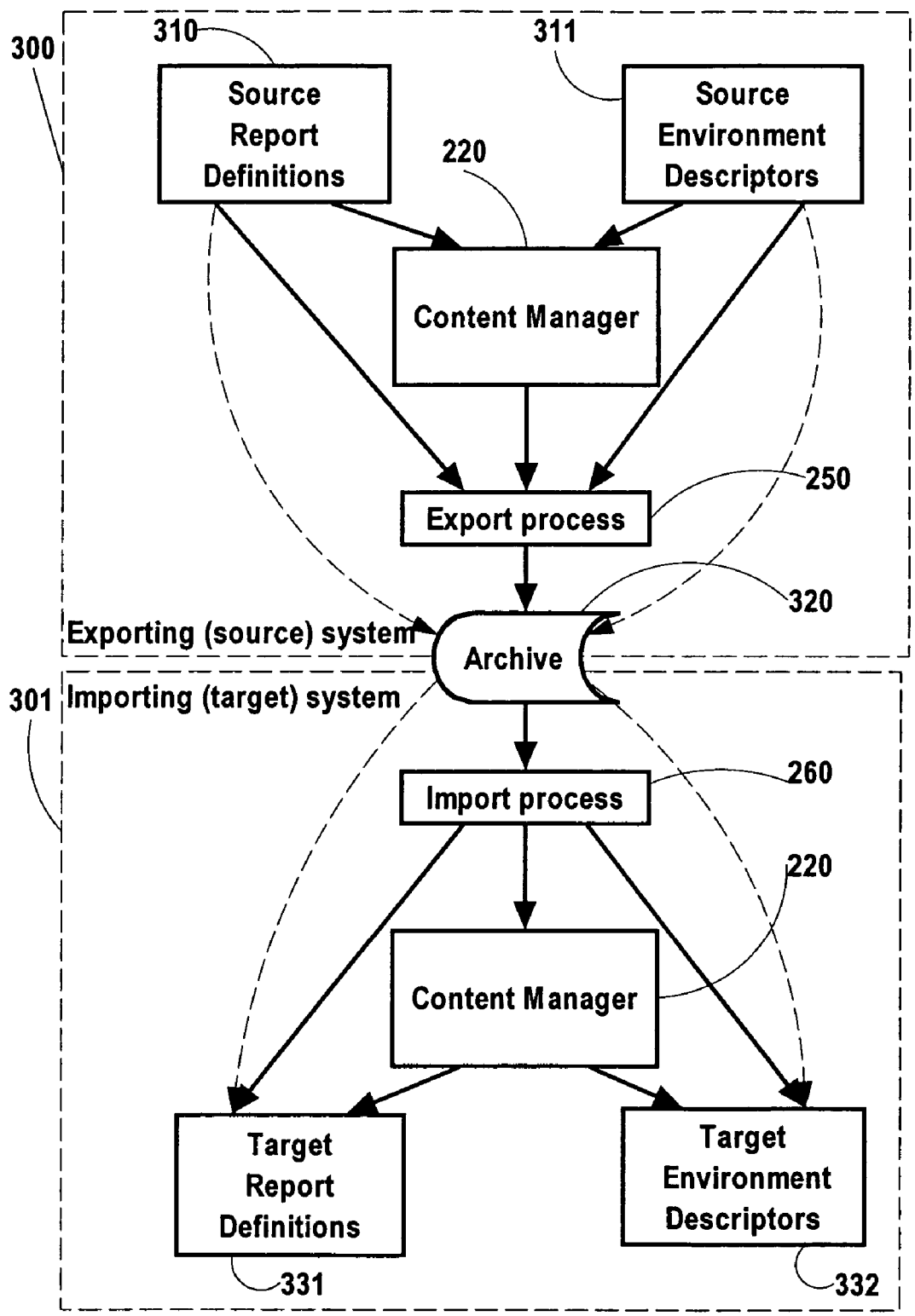
FIG. 3 shows those parts of the content manager system involved in the invention.

FIG. 3 shows the major elements involved in the exchange of information required to transfer entire or partial BI applications between an original source system and a new target system, both systems using the same BI application suite, but having (usually) different data sources and users. The difference between the systems is defined in part by the environment data. Note that in some situations, such as where the invention is used for backup and restore, the original (source) and new (target) environments are the same physical equipment, having the same users and business data sources. In the FIG. 3, the elements of the source or exporting system 300 include the content manager 220, with its associated export process 250. The source environment descriptors 311 with the source report definitions 310 (along with definitions of database connections, model packages, and like definitions, not shown) are translated by the export process 250 into a form suitable for importation and stored in the archive 320. The elements of the corresponding new or importing system 301 include another instance of the content manager 220 and its associated import process 260. The import process 260 creates new target environment descriptors 332 with target report definitions 331 (together with items such as appropriate database connections, and model packages, not shown) from information in the archive 320. These environment descriptors and various definitions and items are then made available to the content manager 220 for reporting purposes.

Figure 4:
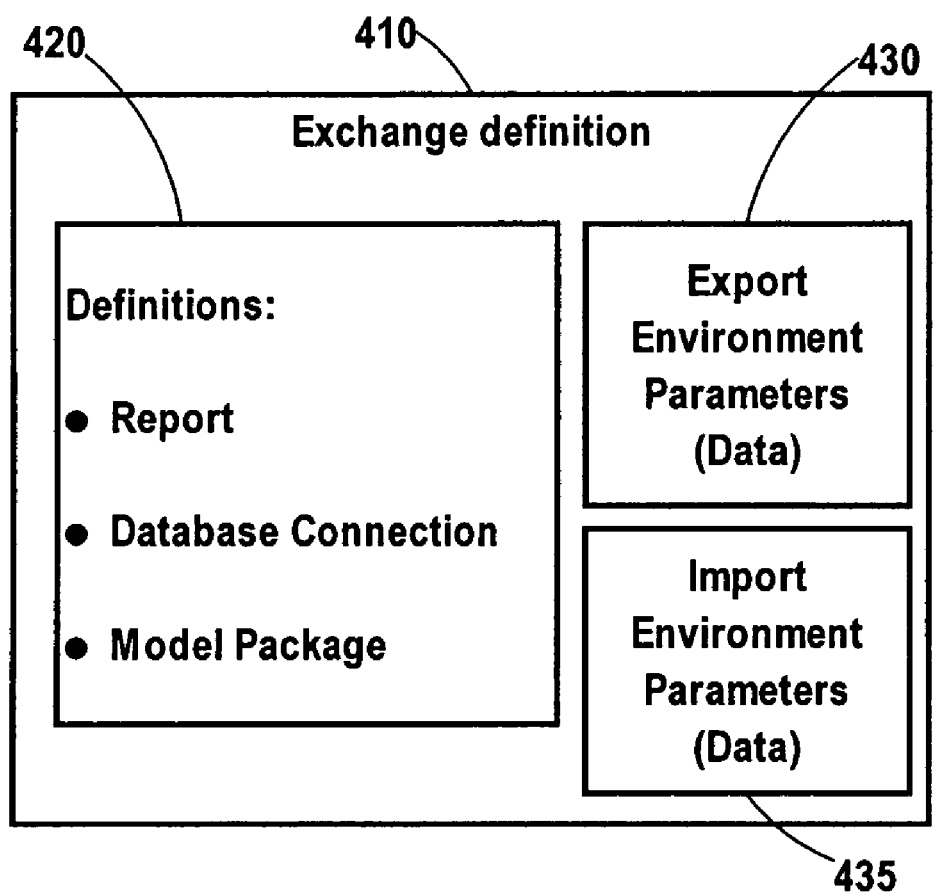
FIG. 4 represents a simplified view of a data structure used in one embodiment of the invention.

FIG. 4 shows a simple exchange definition structure 410 (or export/import definition) for use in embodiments of the invention. The structure includes definitions of reports, database connections, and model packages 420, as well as export environment parameters with their default values and restrictions 430, and import environment parameters with their default values and restrictions 435.

The functionality of embodiments of the invention is next explained from a user perspective. The source or exporting user or system administrator first exports content manager data and metadata describing the application objects and their environment into an exchange definition file on the archive system. Prior to running the exporting process, the user can choose what environment data should be included in the exchange definition. These data might include:

report definitions
reporting schedules,
report execution histories,
groups and roles,
contacts and distribution lists, and
data sources and their related signons. 'Signons' are userids and passwords for use between a reporting application suite and its data sources.

In some embodiments of the present invention the exporting user is able to choose what environment data is made available to the importing user and what defaults are selected for any particular option. In these cases, a simple user interface for such instances of options and selections might make use of check boxes to select data to be included, and radio button or similar user interaction paradigms to provide other information as well as selecting and indicating default behaviour for the importing process.

In some embodiments of the invention the user is able to choose to encrypt the file containing the exchange definition for additional security.

In embodiments of the invention, an importing user (also usually a system administrator) on a target system imports the data from the exchange definition file in the archive into the content manager. During the preparation phase prior to the importing process being executed, where parameters and environment data permits, the importing user may select options or change default selections depending on the contents of the exchange definition file (as previously defined by the exporting user). Again, selection boxes and radio button or similar paradigms may be used. FIGS. 5 and 6 show illustrative user interface displays for an importation process suitable for embodiments of the invention. FIG. 5 shows a first importing screen 501 for an import wizard, the screen 501 having elements each related to one or more parameters in the exchange definition file. FIG. 6 shows a subsequent screen 601 from the same embodiment, and this illustrates more options related to parameters in the exchange definition file.

In some situations conflicts can occur when there is an optional object in the target system, and where an existing object might be either preserved or replaced by the same named object from the exchange definition file. This pertains to items such as groups and roles, schedules, report distribution lists, descriptions of the actual data sources (data sources), and object permissions. Where such a conflict occurs the importing user is prompted to make an appropriate choice.

FIGS. 7 and 8 are example flowcharts for the export process and import process, respectively. These are illustrative of embodiments of the invention. In FIG. 7, the exporting process starts 700, and the user selects report and other definitions to be included, 710, defines the environment parameters 715, and also defines the restrictions and default values for relevant environment parameters 720. The exchange definition file is created using the selected definitions and the environment parameters with their restrictions and defaults, and then written to the archive 725. The process ends 739, although the user may choose to repeat this process to create several more exchange definition files.

In the FIG. 8, the import process starts 800, and an exchange definition file is read from the archive 805. From this file the report and other definitions are recreated 810, and the environment parameters are created 815. The user then selects any options and confirms any default values for relevant environment parameters 820, and the process ends 830.

Embodiments of the invention thus make available to the exporting and importing users, or administrators, relevant export and import options in a convenient and flexible way. A single data descriptor block, the exchange definition file, which includes the report definitions and the related environment data, is used by both the export source process and the import target process, and permits appropriate importing defaults to be provided and, where appropriate, overridden.

Embodiments of the invention can be implemented in digital electronic circuitry or in computer hardware, firmware, and software or in combinations thereof. Apparatus of the present invention can be implemented in a computer program product tangibly embodied in a machine-readable storage device for execution by a programmable processor. For example, the apparatus of one embodiment may include means for selecting a source environment where the business intelligence application system resides, means for selecting business intelligence application objects of the source environment to be exported, means for creating an exchange definition, and means for saving the exchange definition that are embodied by a computer program product tangibly embodied in a machine-readable storage device for execution by a programmable processor of the source system. Likewise, the apparatus of this embodiment may include means for extracting the exchange definition from the archive, means for processing the exchange definition of application objects and means for creating objects in the content manager repository according to the definitions of application objects that are embodied by a computer program product tangibly embodied in a machine-readable storage device for execution by a programmable processor of the target system. As will be noted, these means may also be embodied by other structural elements including, for example, permitting a system administrator or the like to select the source environment where the business intelligence application system resides. The method of the present invention can be performed by a programmable processor executing a program of instructions to perform the functions of the invention by operating on input data and generating output.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method for sharing an exchange definition file between a source system and a target system for a business intelligence application having application objects, the method comprising the steps of:
    a) selecting a report definition in the source system, the report definition being used for constructing business intelligence report, the source system being defined by a source environment;
    b) defining environment parameters for the source environment; the environment parameters including default values and restrictions;
    c) creating the exchange definition file in the source system using the environment parameters, the exchange definition file including the report definition, a database connection, and a model package;
    d) saving the exchange definition file in an archive, the archive accessible by the source system and the target system;
    e) reading the exchange definition file from the archive into the target system;
    f) recreating the report definitions in the target system from the exchange definition file; and
    g) creating new environment parameters in the target system according to the exchange definition file.

2. The method according to claim 1, wherein the source and the target system use the same business intelligence application.

3. The method according to claim 2, wherein the source and the target system have different data sources and users.

4. The method according to claim 2, wherein the step of saving the exchange definition file and the step of reading the exchange definition file from the archive are non-concurrent.

5. The method according to claim 1, wherein the exchange definition file comprises application objects selected from a group consisting of report definitions, reporting schedules, report execution histories, groups and roles, contacts and distribution lists, data sources, database connections, model package and a combination thereof.

6. The method according to claim 1, wherein the exchange definition file is encrypted.

7. A system for sharing an exchange definition file between a source system and a target system for a business intelligence application having application objects, the system comprising:
    means for selecting a report definition in the source system, the report definition being used for constructing business intelligence report, the source system being defined by a source environment;
    means for defining environment parameters for the source environment; the environment parameters including default values and restrictions;
    means for creating the exchange definition file in the source system using the environment parameters, the exchange definition file including the report definition, a database connection, and a model package;
    means for saving the exchange definition file in an archive, the archive accessible by the source system and the target system;
    means for reading the exchange definition file from the archive into the target system;
    means for recreating the report definitions in the target system from the exchange definition file; and
    means for creating new environment parameters in the target system according to the exchange definition file.

8. The system according to claim 7, wherein the source and the target system use the same business intelligence application.

9. The system according to claim 8, wherein the source and the target system have different data sources and users.

10. A storage medium readable by a computer encoding a computer program for execution by the computer to carry out a method for sharing an exchange definition file between a source system and a target system for a business intelligence application having application objects, the computer program comprising:
    code means for selecting a report definition in the source system, the report definition being used for constructing business intelligence report, the source system being defined by a source environment;
    code means for defining environment parameters for the source environment; the environment parameters including default values and restrictions;
    code means for creating the exchange definition file in the source system using the environment parameters, the exchange definition file including a report definition, a database connection, and a model package;
    code means for saving the exchange definition file in an archive, the archive accessible by the source system and the target system;
    code means for reading the exchange definition file from the archive into the target system;
    code means for recreating the report definitions in the target system from the exchange definition file; and
    code means for creating new environment parameters in the target system according to the exchange definition file.

11. The storage medium according to claim 10, wherein the source and the target system use the same business intelligence application.

12. The storage medium according to claim 11, wherein the source and the target system have different data sources and users.

13. The storage medium according to claim 11, wherein the code means for saving the exchange definition file and the code means for reading the exchange definition file from the archive run non-concurrently.

14. The storage medium according to claim 10, wherein the exchange definition file comprises application objects selected from a group consisting of report definitions, reporting schedules, report execution histories, groups and roles, contacts and distribution lists, data sources, database connections, model package and a combination thereof.

15. The storage medium according to claim 10, wherein the exchange definition file is encrypted.

* * * * *